May 7, 1935.  P. H. HUTCHINSON  2,000,288
BORE CUTTING MACHINE
Filed Jan. 15, 1929  5 Sheets-Sheet 1

INVENTOR:
PHILIP H. HUTCHINSON,
BY
HIS ATTORNEY.

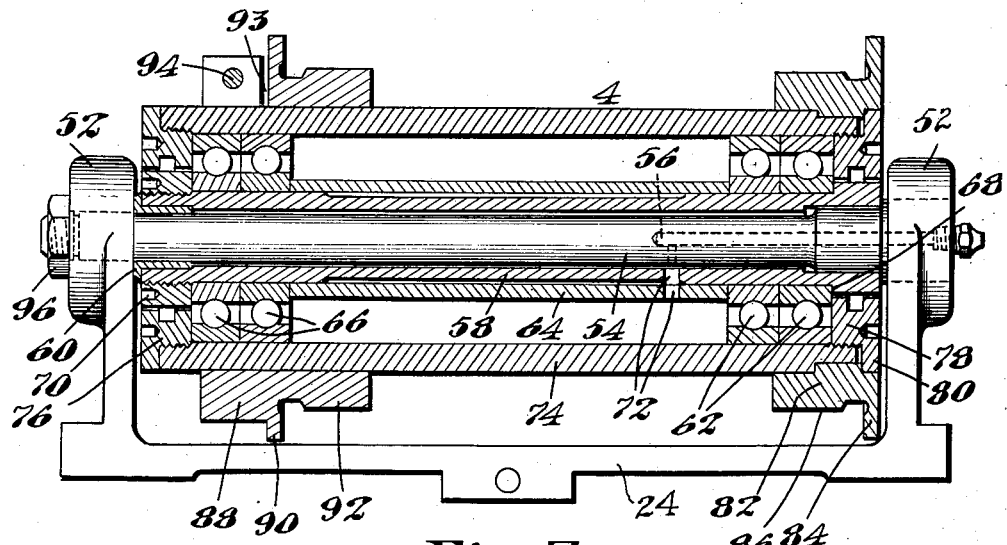
Fig. 7.
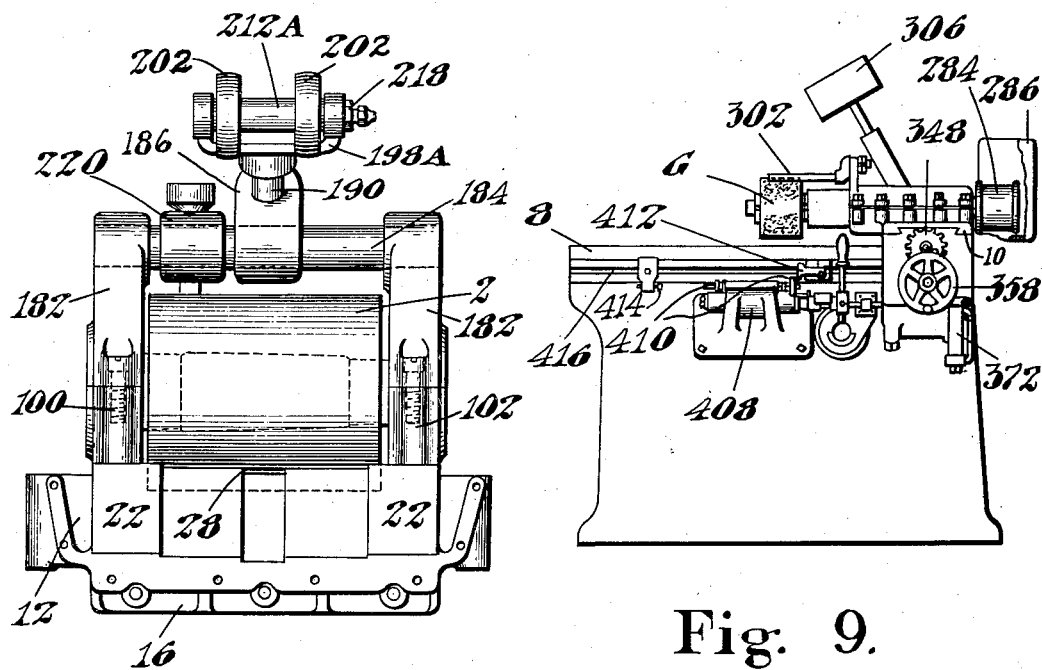
Fig. 8.
Fig. 9.

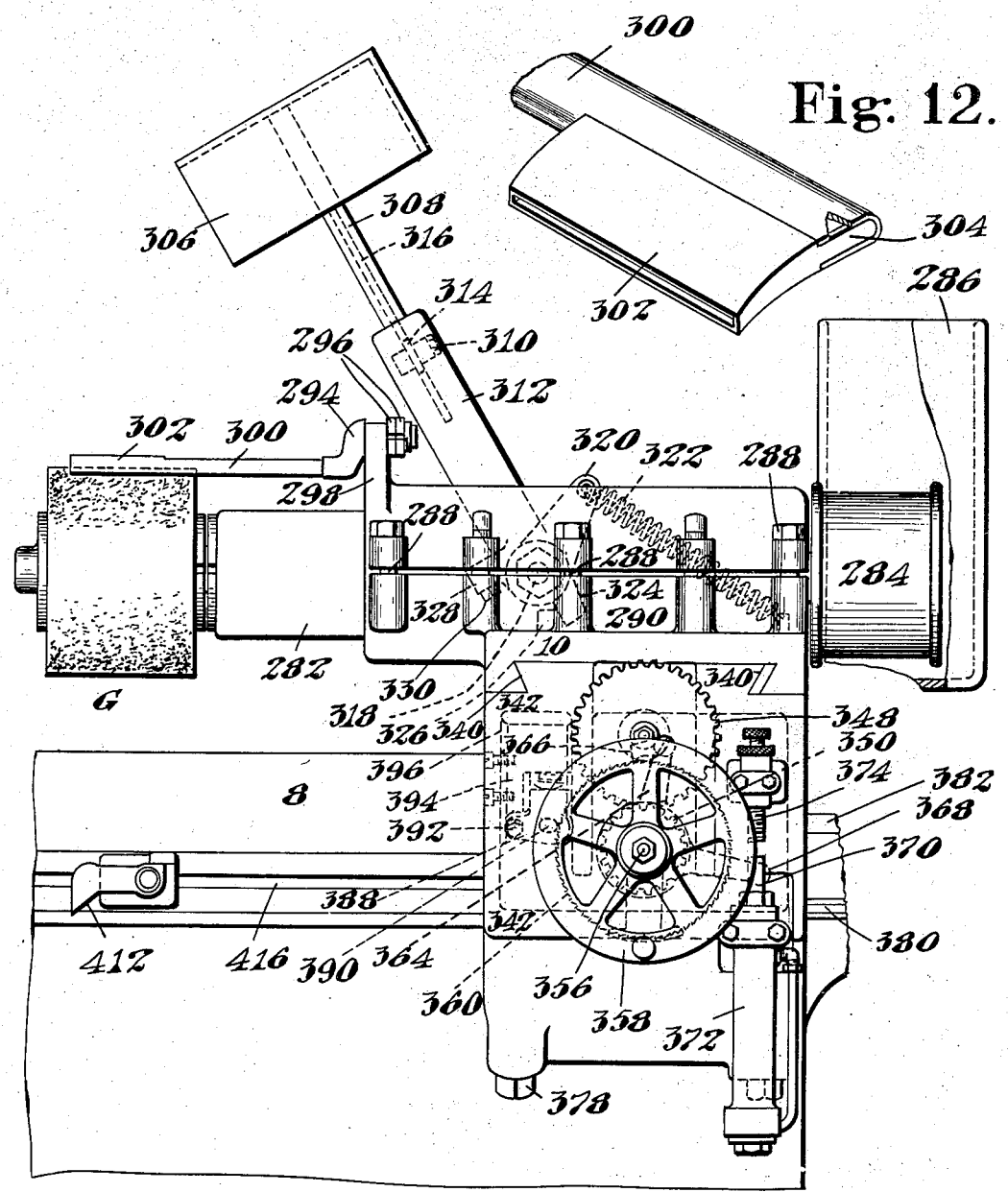

Patented May 7, 1935

2,000,288

UNITED STATES PATENT OFFICE 2,000,288

BORE CUTTING MACHINE

Philip H. Hutchinson, Montclair, N. J., assignor to General Motors Corporation, Detroit, Mich., a corporation of Delaware Application January 15, 1929, Serial No. 332,627

33 Claims. (Cl. 51—103)

This invention relates to bore cutting machines and comprises all the features of novelty herein disclosed in connection with a chuckless internal grinding machine designed more especially for grinding the bores of large sleeves or rings. An object of the invention is to provide a chuckless cutting machine having an improved construction and arrangement of work holding and controlling wheels. Another object is to provide a bore cutting machine having improved features in the construction and operative relation of the work head and cutting tool. Another object is to provide a simplified construction and arrangement of a wheel dressing tool and a work-head such that loading or unloading of the work and wheel dressing are facilitated. To these ends and to improve generally upon machines of this general character, the invention consists in the various matters hereinafter disclosed and claimed. In its broader aspects, the invention is not necessarily limited to the specific construction selected for illustrative purposes in the accompanying drawings in which Fig. 1 is a side view of the work head.

Fig. 7 is a sectional view of the supporting idler wheel arranged for long work-pieces.

Fig. 8 is a front elevation of the work head with supporting idler wheel and associated parts removed.

Fig. 9 is a front elevation of the machine with work head removed.

Fig. 11 is a front elevation of the grinding wheel head and

Fig. 12 is a perspective view of a nozzle for cooling fluid.

A work-piece W, such as a sleeve or ring to be internally machined or ground, is rotatably supported between a backing wheel 2, a supporting idler wheel 4, and a pressure applying idler wheel 6, all the wheels turning on axes that are precisely parallel to one another when the work-piece is a straight hollow cylinder with a straight cylindrical bore. A cutting tool, such as a grinding wheel G, engages the bore of the work-piece at a line directly opposite the line of contact between the outer periphery of the work-piece and the periphery of the backing wheel. One or more of the wheels on the work-head is driven to turn the work-piece at a speed about that usually obtained with the use of an ordinary chuck and preferably the backing wheel 2 is driven in which case it also controls the speed of rotation of the work. When straight hollow cylinders are being machined internally to have uniform wall thickness, the axis of the grinding wheel is maintained parallel to the axes of the other wheels but is fed in an inclined plane including both the axis of the backing wheel 2 and the line of contact of this wheel with the work. Either the tool or the work is preferably given an axial reciprocation and, in the illustrated construction, the work head, which comprises the work-supporting wheels and their mountings, is mounted on a sliding carriage or table 8 while the tool head is mounted on a cross feed slide 10. The grinding wheel preferably rotates downwardly at the work but the backing wheel can be rotated in either direction with almost equally good results. The supporting wheel 4 is lower than the other wheels and located at the front to facilitate insertion of the work-piece rearwardly over it, the piece being loaded by a radial movement transverse to the direction of table reciprocation, the wheel 6 then being swung backwardly.

Figure 5:
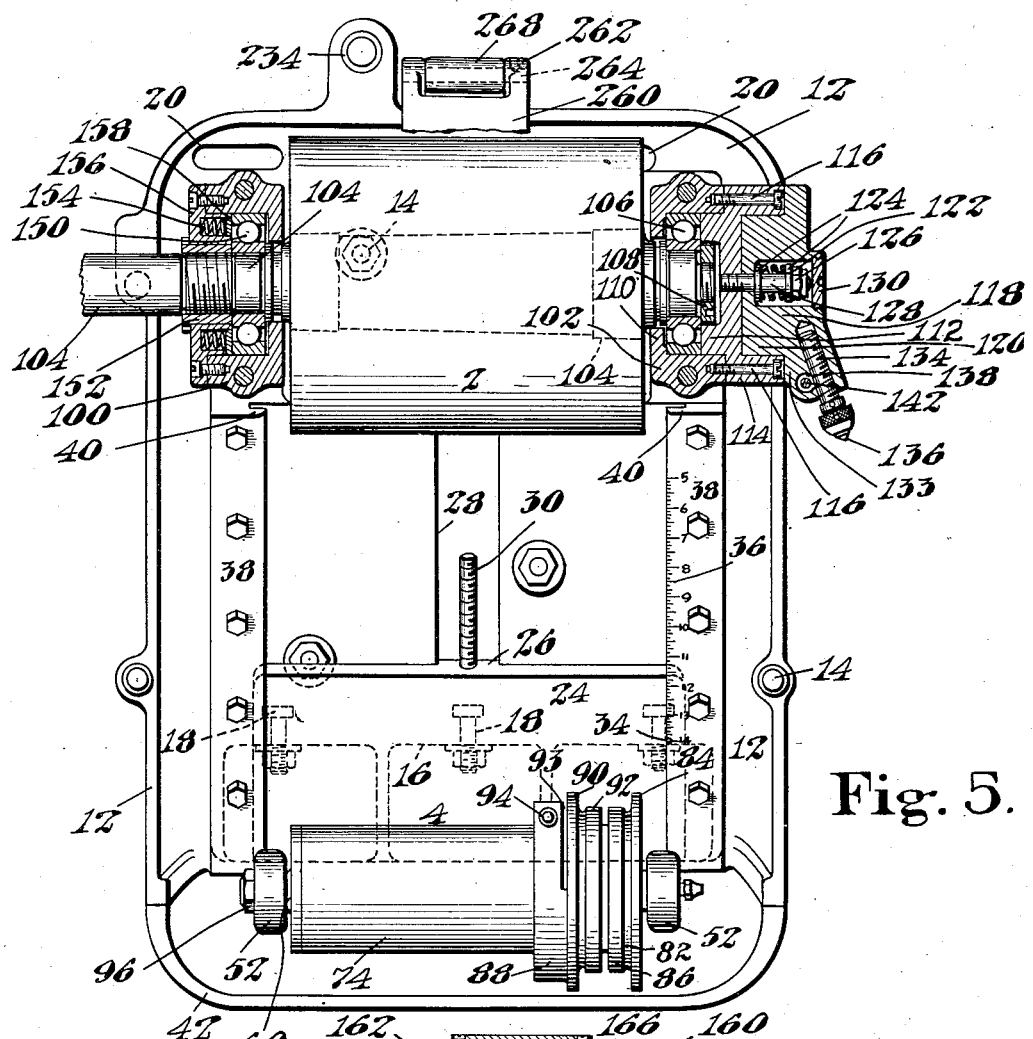
Fig. 5 is a plan view of the work head with some parts removed and some in section.

The work head includes a casting 12 bolted to the table by vertical bolts 14 and having a flange 16 bolted to the front of the table by T-bolts 18 whose squared heads enter a slot in the table. The casting forms a pan underlying the wheels to collect cooling fluid which drains off through the apertured bosses 20 at the rear. Inclined ways 22 support a slide 24 having a central tongue 26 entering a groove 28 between the ways. A screw 30 having an operating handle 32 is threaded in the slide for adjusting it on the ways, a pointer 34 on the slide cooperating with a scale 36 to indicate the proper position of the slide for work of different sizes. The scale indicates work diameters and is formed on one of two guide plates 38 bolted to the casting and having tongues 40 overhanging the sides of the slide. The screw has an unthreaded portion journalled in a plate 42 which forms the front wall of the pan or casting 12. The screw is held from endwise movement by a collar 44 fitting the bottom of a cylindrical recess in the plate 42, the collar also abutting against a flange 46 of a bearing plate 48. A felt bushing 50 between the screw and the flange prevents leakage of cooling fluid. The slide has a pair of spaced standards 52 (Fig. 7) supporting a shaft 54 having a lubricating duct 56. A hollow spindle or sleeve 58 is supported by the shaft and by a flanged bushing 60. The spindle carries antifriction bearings for the supporting idler wheel 4. Two ball bearings 62, a spacing sleeve 64, and two ball bearings 66 are clamped between a shoulder 68 of the spindle and a ring nut 70. Lubricant ducts 72 in the spacing sleeve and spindle communicate with the duct 56 to conduct lubricant to the bearings. The outer race rings of the ball bearings support a rotary sleeve 74 closed at the ends by ring nuts 76 and 78. The nut 78 has a flange 80 holding a work guiding member 82 against a shoulder of the sleeve 74. The member 82 has a work guiding flange 84 and a cylindrical work supporting surface or rail 86. A second work guiding member 88 is axially adjustable on the sleeve 74 and has a work guiding flange 90 and a cylindrical work supporting surface or rail 92. The member 88 has an end part with an arcuate kerf 93 and this end part is radially split and provided with a clamping screw 94 by which it is held in adjusted position in the proper spaced relation to member 82 to accommodate work of different lengths. For very long work-pieces it is desirable to replace the guiding members 82 and 88 of Fig. 5 by others which have wider cylindrical surfaces or rails arranged as in Fig. 7. Accordingly it is only necessary to remove a clamping nut 96 to enable the shaft 54 to be drawn out endwise through the right hand standard 52. The right hand standard has a larger bore than the other and the right end of the shaft is larger than the other end whereby the shaft can be tilted a little when its smaller portion is moved into the larger bore. This enable the shaft to be removed without interference with the side of the pan or casting 12 and then the bearing assembly is free to be lifted upwardly when replacing the work supporting idler formed by the members 82 and 88. The idler wheel is adjustable by its inclined slide to suit the diameter of the work.

Figure 1:
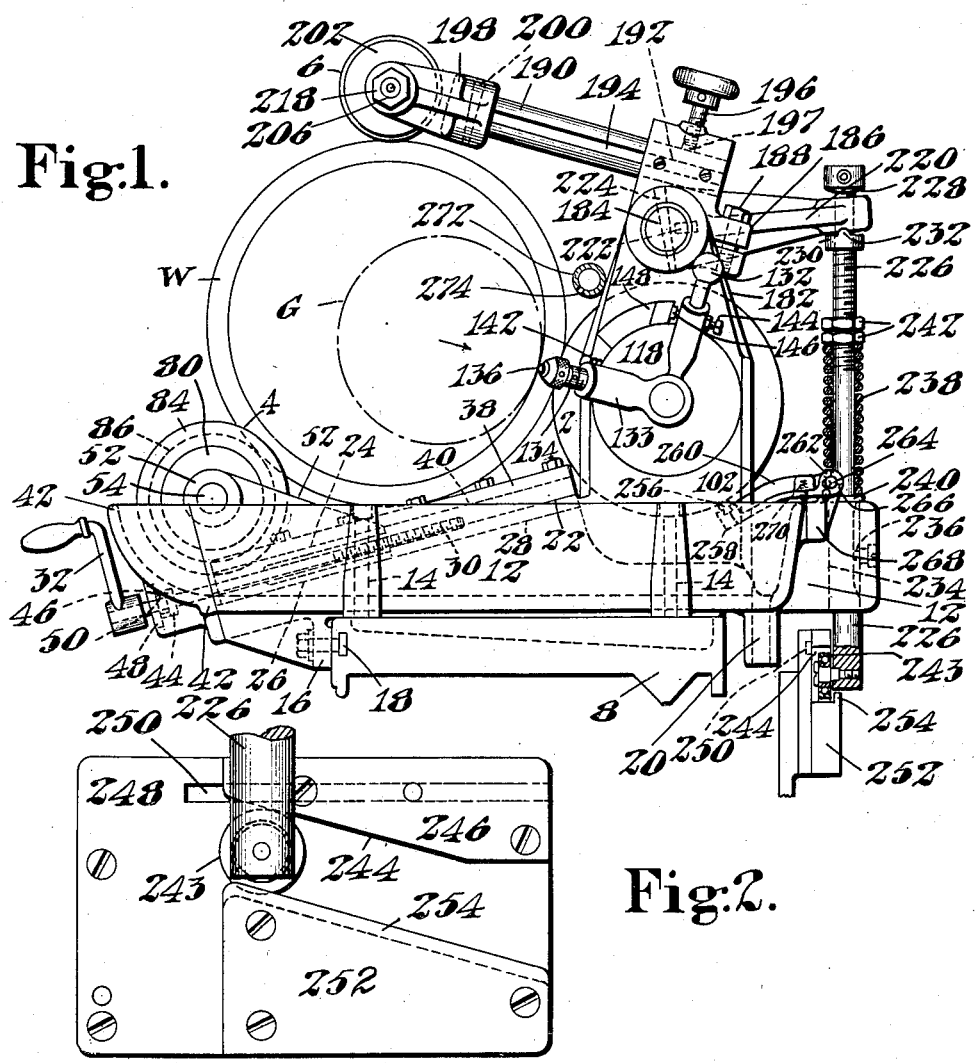
Figure 2:
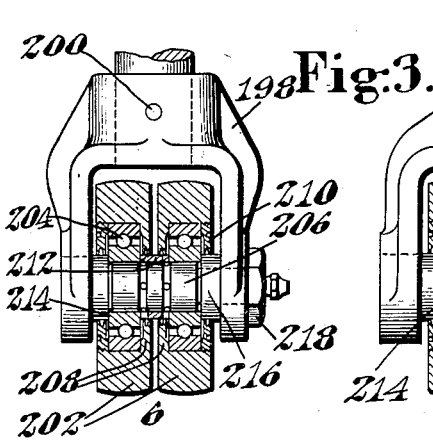
Fig. 2 is a rear view of the operating cam for a pressure idler wheel.
Figures 3, 4:
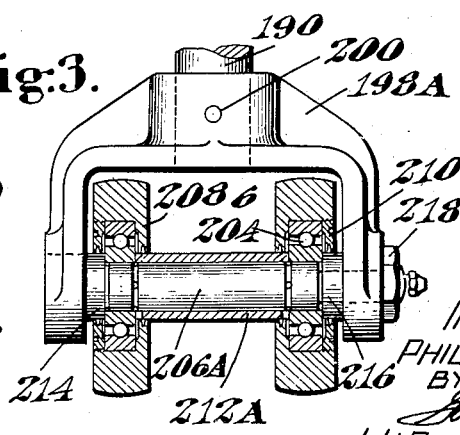
Fig. 3 is a sectional view of the pressure idler wheel for short work-pieces.
Fig. 4 is a sectional view of the pressure idler wheel arranged for long work-pieces.
Figure 6:
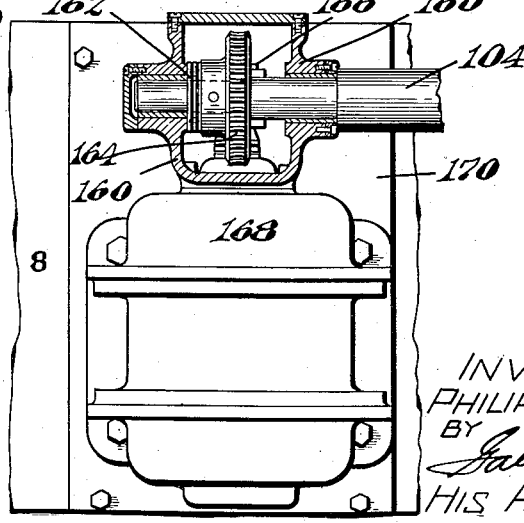
Fig. 6 is a plan view, partly in section, of the drive mechanism for the work head.
Figure 10:
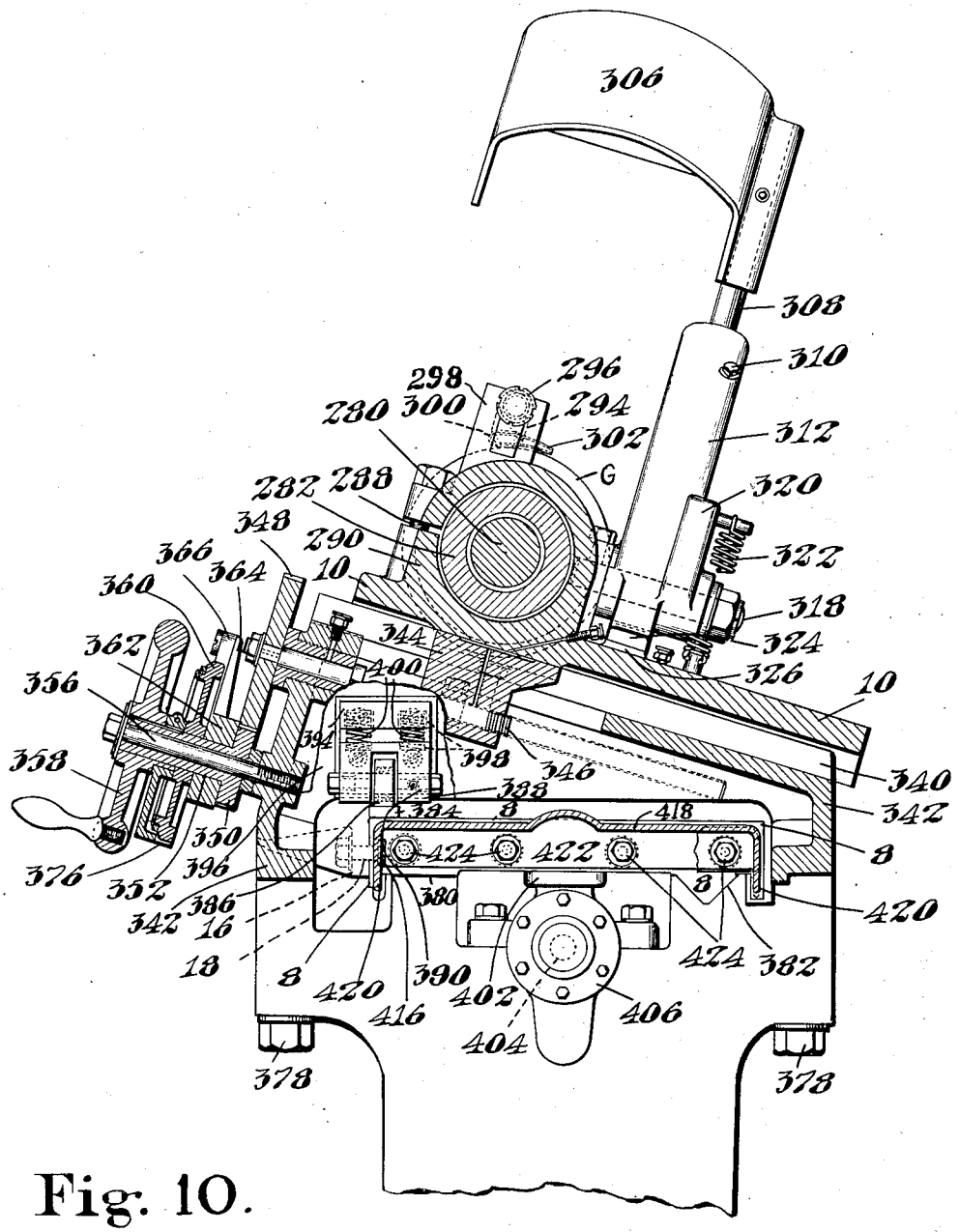
Fig. 10 is a transverse sectional view of the grinding wheel head.

The pan or casting 12 also has spaced standards or bearing housings 100 and 102 (Figs. 5 and 8) by which the backing or control wheel 2 is rotatably supported. This wheel is a plain cylindrical wheel with a tapered bore fitting a tapered portion of a shaft 104. The inner race ring of a ball bearing 106 is clamped on one end of the shaft by a nut 108. The outer race ring of the ball bearing is clamped against a flange 110 of the standard 102 by a flange 112 on an end cap 114 secured by screws 116 to the standard. The end cap also supports a swinging dressing tool holder having a diamond for dressing the grinding wheel. A plate or holder 118 has a cylindrical boss 120 journalled in a recess of the end cap and held frictionally by an expansible coil spring 122 pressing between washers 124, one washer engaging the plate 118 and another engaging a nut 126 on a stud 128 screwed to the end cap. The spring and washers are enclosed in a recess which is closed by a threaded cap 130. The plate has an operating knob or handle 132 (Fig. 1) and has a boss 133 tapped for a screw stud 134 carrying a diamond 136. The stud is held in adjusted position by a brass shoe 138 surrounding a screw 142 in a recess of the plate. The diamond swings down to lie in the continuation of the line where the grinding wheel engages the work, the position being adjusted for work of different diameters by a stop screw 144 on the handle and a stop button 146 attached to an arcuate plate 148 on the end cap 114. The radial distance of the diamond beyond the surface of the backing wheel is approximately equal to the desired wall thickness of the work-piece and it is apparent that the diamond will also lie on a radial line connecting the axis of the grinding wheel with the axis of the backing wheel. Here the diamond can remain for any desired number of grinding cycles because the work is inserted and removed transversely of the wheels and the diamond is out of its path. Hence the diamond remains in a position to dress the grinding wheel at every cycle without needing any mechanism to move it out of the path of the work. In the standard 100, the inner race ring of a ball bearing 150 is clamped on the shaft 104 by a nut 152 while the outer race ring of the bearing is slidably mounted in the standard 100. To prevent radial play, an initial thrust load is placed on the bearing by coil springs 154 set in recesses of an end cap 156 and bearing against a washer 158 which engages one end of the outer race ring. The shaft 104 is journalled in a housing 160 (Fig. 6) and carries a ball thrust bearing 162 and a worm wheel 164 driven by a worm 166 on the shaft of an electric motor 168 whose housing is bolted to the housing 160. Both housings are secured to a plate 170 which is bolted to the reciprocating table 8 so that the driving mechanism and work supporting wheels all travel in unison.

The standards or bearing housings 100 and 102 are completed by brackets 182 (Figs. 1 and 8) which extend upwardly to form bearings for a rock shaft 184. An angular split bracket 186 is secured to the rock shaft by a clamping screw 188. The bracket 186 has an opening receiving a roll carrying bar or arm 190, a key 192 on the bracket entering a long keyway 194 in the bar to hold the bar from turning. The bar can be clamped in adjusted position, according to the size of the work, by a hand screw 196 threaded in the top of the bracket to press a brass shoe 197 against the bar. A fork 198 is removably secured to the end of the bar or arm 190 by a taper pin 200 and carries the pressure idler wheel 6. The pressure idler is composed of two rolls 202 having crowned peripheries and arranged close together in a small fork for narrow work. The rolls are mounted for independent rotation on ball bearings 204 supported by a shaft 206. The outer race ring of each bearing is clamped against a flange 208 of the roll by a ring nut 210. The inner race rings, together with a spacing sleeve 212, are clamped between a shoulder 214 of the shaft and a spacing collar 216 by a nut 218 engaging one arm of the fork. On removal of the nut, the shaft can be driven out through the opposite arm of the fork which has a larger bore. The provision for independent rotation of the rolls prevents any tendency of the work to creep endwise as might occur if the work has a very slight taper. For long work-pieces, it is desirable to substitute a wider fork 198A, a longer shaft 206A, and a longer spacing sleeve 212A spacing the rolls further apart. If cylindrical work-pieces are finished externally on centerless grinders, their exterior surfaces will not have an accidental taper great enough to prevent the two coaxial rolls 202 from meeting the work surface upon application of pressure through the arm 190. Hence torsion and other give in the parts will compensate for any small initial lack of parallelism between the surfaces of the rolls and the work surface, the single-row bearings 204 permitting a slight tilting or self-aligning action of the rolls 202 under load while the crowned exteriors of the independently rotatable rolls maintain rolling contact at two spaced points with the work without rubbing. The shaft 184 is rocked by a lever arm 220 which is secured to the shaft by a key 222 and a taper pin 224. The arm has an opening for a vertically slidable rod 226 having a rounded nut 228 threaded on its upper reduced end. The rod also has a smooth portion for a collar 230 having rounded bearing lugs 232 engaging rounded seats in the arm. The rod has a sliding bearing at 234 in the casting 12 and is held from rotation by a pin 236 entering a keyway. A coil spring 238 supported by a washer 240 tends to lift the rod by engagement with nuts 242 which adjust the tension of the spring. This spring furnishes the tension for pressing the idler wheel down against the work and so holding the work against the supporting idler wheel and the driven backing wheel. The spring comes into action when the table moves towards the grinding position, and the pressure idler is automatically elevated when the table retreats away from grinding position. The rod carries an antifriction roller 243 running on an inclined cam 244 formed on a cam bar 246 attached to a plate 248 on the frame of the machine. The cam bar is located by a rib entering a slot 250 in the plate 248. The antifriction roll is confined by a plate 252 having a lip or flange 254. From the above, it will appear that the arm 220 together with bar 190 and bracket 186 form a lever rocking with the shaft 184 under control of the cam. The swinging of the idler wheel towards the rear of the machine facilitates feeding the work in at the front.

To clean grit from the backing wheel, a felt wiper 256 constantly bears on its periphery. The wiper is held by a clamp plate 258 to an arm 260 having bearing lugs 262 pivoted on a shaft 264 which is held by a set screw 266 to a bracket 268 screwed to the casting 12. A coil spring 270 sets in a recess of the arm 260 and bearing on the bracket holds the wiper yieldingly against the wheel. Cooling and cleaning fluid is conveniently directed against the backing wheel and the exterior of the work-piece over its whole length by a pipe 272 attached to the brackets 182 and having a longitudinal slit 274 forming a discharge outlet.

The grinding wheel G is carried by a spindle 280 journalled in a quill 282 and driven by a pulley 284 housed in a guard 286 which is open upwardly to admit an overhead driving belt. The quill is removably clamped by screw bolts 288 in a split housing 290 on the cross feed slide 10. A brass hose connection 294 with threaded end is clamped by nuts 296 in a forked bracket 298 on the housing. The hose connection is of generally elliptical shape at its lower end and is brazed to an elliptical pipe 300 which extends out over the grinding wheel close to its periphery. The pipe is slit at the rear and an elongated tapering nozzle 302 is brazed to the pipe over the slit, the nozzle having an elliptical end plate 304 to close the end of the pipe. The nuts and the fork in the bracket 298 enable the nozzle to be adjusted so it will conform closely to the wheel and the nozzle directs cooling fluid tangentially over the wheel in a uniform layer, the rearward rotation of the wheel carrying the liquid to the work at the line where grinding occurs.

It should be noted that both the wheel and the nozzle enter the bore of the work. This is rendered possible even if a feeler gauge is used because the gauge can enter the bore of the work from the opposite end.

A spatter guard 306 overlies the work and the grinding wheel, being keyed to a rod 308 clamped by a screw 310 in the split end of a hollow arm 312, the screw also holding a key 314 which enters a keyway 316 in the rod. The arm has a hub pivoted on a stud 318 fastened at the rear of the housing 290. The guard is lifted by a second arm 320 integral with the hub of the first arm and connected by a coil spring 322 to the cross slide 10. The arm 312 has an extension 324 to engage a lug 326 on the cross slide to limit the swinging in one direction and a second extension or lug 328 carries a bumper screw 330 to limit swinging in the other direction. The guard may be lifted and lowered automatically in any suitable way as by connecting the table 8 and the guard by a cable.

The cross slide 10 runs on dovetail ways 340 on a bridge 342 and the ways run downwardly to the rear so that grinding wheel pressure has a downward component tending to press the work down on its supporting wheels. Thus the backing wheel can be mounted lower and on shorter and more rigid supports, so diminishing the tendency of the reciprocating table to tilt under grinding wheel pressure. The cross slide carries a nut 344 engaged by a feed screw 346 journalled at the front of the bridge and carrying a gear 348 driven by a gear 350 on a driven sleeve 352 which is journalled on a stud 356 and controlled either by hand wheel 358 or by a ratchet wheel 360. A lever having a hub 362 is rockably mounted on the sleeve, one arm 364 carrying a pawl 366 engaging the ratchet wheel and another arm 368 being actuated intermittently by a vertical piston rod 370 extending upwardly from a cylinder 372 connected by pipes to the reversing valve of the hydraulic system which reciprocates the table. An adjusting screw 374 limits the stroke of the pawl and a shield 376 may be set to lift the pawl, the shield being carried by an arm which is hung on the hub of the hand wheel. The bridge 342 is secured to the frame of the machine by bolts 378 and arches over the reciprocating table 8 which slides on ways 380 and 382 of the frame. A rail 384 fastened to the table is engaged by a spring pressed roll 386 to hold the table down on its ways and balance the canting tendency caused by pressure of the grinding wheel and by the compression of the pressure idler spring 238 by the vertical rod 226 and cam 244. The roll 386 is located in a fork of a lever 388 and rotates on an antifriction bearing carried by a shaft 390 supported in the arms of the fork. The lever is pivoted at 392 to an angular bracket 394 bolted to an inner wall 396 of the bridge. The bracket and the lever have opposed recesses 398 forming seats for coil springs 400. Thus the springs create a yielding downward pressure from the fixed bridge to the sliding table. The table has a bracket 402 connected to a piston rod 404 operated by a cylinder 406 fastened to the main frame and controlled by a main valve 408 on the front of the machine, the main valve being controlled by auxiliary valves 410 actuated by reversing dogs 412 and 414 adjustably fastened in a slot 416 on the table. An apron 418 having side flanges 420 and an end flange 422 is secured to the end of the table by bolts 424.

I claim:

1. In a chuckless machine for cutting bores, a rotary cutting tool, a work head, a sliding table for one of said members to enable the tool to engage the bore of a hollow work-piece, a backing wheel and a supporting wheel rotatably mounted on the work head for rolling contact with the work-piece, an arm rockably mounted on an axis adjacent to one of the wheels, a pressure wheel carried by the arm for holding the work-piece against the other wheels, and means for regulating the length of the arm in accordance with the size of the work-piece; substantially as described.

2. In a chuckless machine for cutting bores, a cutting tool, a work head, a sliding table for one of said members to enable the tool to engage the bore of a hollow work-piece, a backing wheel and a supporting wheel rotatably mounted on the work head for rolling contact with the work-piece, a lever rockably mounted on an axis adjacent to the backing wheel, a pressure wheel carried by one arm of the lever at the front of the backing wheel, a sliding rod connected to the other arm of the lever at the rear of the backing wheel, and a cam for actuating the rod during the sliding of the table; substantially as described.

3. In a chuckless machine for cutting bores, a cutting tool, a work head, a sliding table for one of said members to enable the tool to engage the bore of a hollow work-piece, a backing wheel and a supporting wheel rotatably mounted on the work head for rolling contact with the work-piece, a lever rockably mounted on an axis adjacent to the backing wheel, a pressure wheel carried by one arm of the lever, a sliding rod connected to the other arm of the lever, a spring for lifting the rod to hold the pressure wheel against the work-piece, and a cam for lowering the rod to lift the pressure wheel from the work-piece; substantially as described.

4. In a chuckless machine for cutting bores, a rotary cutting tool, a work head, a sliding table for one of said members to enable the tool to engage the bore of a hollow work-piece, a backing wheel and a supporting wheel rotatably mounted on the work head for rolling contact with the work-piece, the supporting wheel being mounted lower than the backing wheel to facilitate radial insertion of the work-piece over the supporting wheel from the front, the backing wheel having supporting standards with extensions projecting above it, means for causing a relative cross feeding movement between the cutting tool and the backing wheel and a pressure wheel having a rockable mounting in the extensions of the standards to swing back from the low supporting wheel; substantially as described.

5. In a chuckless machine for cutting bores, a rotary cutting tool, a work head, means for causing a relative movement between the tool and work head to enable the tool to engage the bore of a hollow work-piece, a backing wheel and a supporting wheel rotatably mounted on the work head for rolling contact with the work-piece, a third wheel comprising co-axial independently rotatable idler rolls for holding the work-piece against the other wheels, and means for compensating for lack of initial parallelism between the work surface and the idler rolls; substantially as described.

6. In a chuckless machine for cutting bores, a rotary cutting tool, a work head, means for causing a relative movement between the tool and work head to enable the tool to engage the bore of a hollow work-piece, a backing wheel and a supporting wheel rotatably mounted on the work head for rolling contact with the work-piece, and a third wheel comprising independently rotatable idler rolls for holding the work-piece against the other wheels, said rolls being mounted on a common axis and having their peripheries transversely crowned; substantially as described.

7. In a chuckless machine for cutting bores, a work head having a series of wheels for peripheral contact with a round work-piece, a cutting tool head, a longitudinally sliding table for one of said heads to enable the cutting tool to engage the bore of the work-piece, and a cross feed slide for one of said heads, said slide being inclined crosswise of the table to produce a downward component of pressure between the cutting tool and the work; substantially as described.

8. In a chuckless machine for cutting bores, a work head having a series of wheels for peripheral contact with a round work-piece, a cutting tool head, a longitudinally sliding table for one of said heads to enable the cutting tool to engage the bore of the work-piece, a bridge arching over the table and having ways inclined crosswise of the table, and a cross feed slide mounted on the inclined ways of the bridge and supporting one of said heads; substantially as described.

9. In a chuckless machine for cutting bores, a work head having a series of wheels for peripheral contact with a round work-piece, a cutting tool head, a longitudinally sliding table for one of said heads to enable the cutting tool to engage the bore of the work-piece, a bridge arching over the table and having ways extended crosswise of the table, a cross feed slide mounted on the ways of the bridge and supporting one of said heads, and means interposed between the bridge and the table for counteracting the tendency of the table to tilt due to cutting tool pressure; substantially as described.

10. In a chuckless machine for cutting bores, a work head having a series of wheels for peripheral contact with a round work-piece, a cutting tool head, a longitudinally sliding table for one of said heads to enable the cutting tool to engage the bore of the work-piece, a bridge arching over the table and having ways extended crosswise of the table, a cross feed slide mounted on the ways of the bridge and supporting one of said heads, and a spring-pressed roller carried by the bridge and engaging the table for counteracting the tendency of the table to tilt; substantially as described.

11. In a machine for cutting bores, a work head, a cutting tool head, a longitudinally sliding table for one of said heads to enable the cutting tool to engage the bore of the work-piece, a bridge arching over the table and having ways inclined crosswise of the table, and a cross feed slide mounted on the inclined ways of the bridge and supporting one of said heads; substantially as described.

12. In a machine for cutting bores, a grinding wheel, a work head, a backing wheel rotatably mounted on the work head, a work supporting wheel rotatably mounted on the work head in a position to support a work-piece with its axis higher than the axis of the backing wheel, and a cross feed slide for causing a relative feeding movement between the work and the grinding wheel along an inclined plane through the axis of the work-piece and the axis of the backing wheel; substantially as described.

13. In a chuckless cutting machine, a cutting tool, a work head, means for causing a relative feeding movement of approach between the tool and the work head, wheels rotatably mounted on the work head for rolling contact with the work-piece, and means for holding the work-piece against the wheels comprising a pair of spaced rolls having crowned peripheries, and a shaft having means for supporting the rolls for independent rotation on a common axis with capacity for tilting; substantially as described.

14. In a chuckless cutting machine, a cutting tool, a work head, means for causing a relative feeding movement of approach between the tool and the work head, wheels rotatably mounted on the work head for rolling contact with the work-piece, and means for holding the work-piece against the wheels comprising a pair of spaced rolls, a shaft having means for supporting the rolls for independent rotation on a common axis, and a fork having arms removably supporting the shaft; substantially as described.

15. In a chuckless cutting machine, a cutting tool, a work head, means for causing a relative feeding movement of approach between the tool and the work head, a pair of wheels rotatably mounted on the work head for rolling contact with the work-piece, a pair of arms having bores, a shaft extending through said bores, means for removably clamping the shaft rigidly to one of the arms, and a third wheel comprising a pair of spaced rolls independently rotatable on said shaft; substantially as described.

16. In a precision machine for grinding bores, a grinding wheel, a work head, a sliding table for one of said members to enable the grinding wheel to engage the bore of a hollow work-piece, means for causing relative cross feeding movement between the wheel and the work to enable the grinding wheel to engage the inner wall of the work-piece, a backing wheel and a supporting wheel rotatably mounted on the work head for rolling contact with the work-piece, one of the wheels being higher than the other and the backing wheel engaging the outer wall of the work-piece at a point opposite to the operative portion of the grinding wheel, an arm rockably mounted on an axis adjacent to the higher one of the wheels, and a pressure member carried by the arm for holding the work-piece against the wheels and movable with the arm to provide for inserting the work-piece laterally over the lower wheel into contact with the higher one; substantially as described.

17. In a precision machine for grinding bores, a grinding wheel, a wheel head, a work head, a sliding table for one of said heads to enable the grinding wheel to engage the bore of a hollow work-piece, wheels for rotatably supporting the work-piece, the wheels having rolling contact with the external periphery of the work-piece whereby the work-piece can be mounted upon them by a radial loading movement towards the surfaces of the wheels, a wheel dressing tool mounted beyond one end of the work-piece and out of its radial path of introduction to and removal from the work-head, and means for adjusting said tool to locate its operative portion on a line connecting the axis of the grinding wheel with the axis of one of the supporting wheels; substantially as described.

18. In a grinding machine, a grinding wheel, a work head, a sliding carriage for one of said members, a frame supporting the carriage, work supporting wheels on the work head, a pressure member bodily movable with respect to the wheels to engage or release a work-piece, a lever rockably mounted on the work head and carrying the pressure member, a spring pressed rod guided by the work head, means for transmitting spring pressure from the rod to the lever, and means on the frame for causing actuation of the spring pressed rod by the sliding movement of the table on the frame; substantially as described.

19. In a grinding machine, a grinding wheel, a work head, a sliding carriage for one of said members, a frame supporting the carriage, work engaging wheels on the work head, one of said wheels being bodily movable to engage or release the work, a lever rockably mounted on said work head and carrying the movable wheel, and coacting mechanism between the frame and the lever for causing the sliding movement of the carriage with respect to the frame to swing the movable wheel toward or from the work; substantially as described.

20. In a precision machine for grinding bores, a work head having a backing wheel for peripheral contact with a round work-piece, a tool head, a grinding wheel projecting from the tool head to enter the bore of the work-piece, a cross feed slide for the tool head, and means for guiding the slide at an inclination to give the grinding wheel a downward component of feeding movement with respect to the backing wheel; substantially as described.

21. In a precision machine for grinding bores, a work head having a plurality of wheels for peripheral contact with a round work-piece, a grinding wheel and a head therefor, means for causing relative movement of reciprocation between the grinding wheel and the work-piece lengthwise of the work-piece, a movable carrier supporting one of the heads for cross feeding movement with respect to the other, and means for guiding the carrier at an inclination to and transversely of a horizontal plane passing through the line of reciprocation; substantially as described.

22. In a machine of the character indicated, a work-altering tool, a work-head, a sliding table for one of said parts to provide for bringing the tool and a hollow work-piece into telescoping relation, the work-head comprising a backing member and a supporting member having line contact with the periphery of the work-piece, an arm rockably mounted on an axis adjacent to one of said work-contacting members, a pressure member carried by the arm for holding the work-piece against said work-contacting members, and means for regulating the length of the arm; substantially as described.

23. In a machine of the character indicated, a work-altering tool, a work-head, means for causing relative axial movement between the tool and the work-head to provide for bringing the tool and a hollow work-piece into telescoping relation, the work-head comprising a backing member and a supporting member for line contact with the periphery of the work-piece, the supporting member being lower than the backing member to facilitate radial insertion of the work-piece over the supporting member and towards the backing member, a pressure member to hold the work-piece against the backing member and the supporting member, and a swinging support for the pressure member and having its axis above the backing member, the support extending rearwardly from the pressure member to said axis above the backing member to lie out of the path of insertion of the work-piece over the supporting member; substantially as described.

24. In a machine of the character indicated, a work-altering tool, a work-head, means for causing relative axial movement between the tool and the work-head to provide for bringing the tool and a hollow work-piece into telescoping relation, the work-head comprising a backing member and a supporting member having line contact with the periphery of the work-piece, and means providing for a relative cross feeding movement between the tool and the backing member, said direction of feed being out of the horizontal to provide a downward component of pressure between the tool and the work-piece; substantially as described.

25. In a machine of the character indicated, a work-altering tool, a work-head comprising a backing wheel and a supporting member, the backing wheel opposing the pressure of the tool, and means for causing a relative cross feeding movement between the tool and the backing wheel, said direction of feed being out of the horizontal to provide a downward component of pressure between the tool and the backing wheel; substantially as described.

26. In a precision grinding machine, a grinding wheel, a work-head, means for causing relative axial movement between said wheel and said work-head to provide for getting the wheel and a hollow work-piece into or out of telescoping relation, a wheel dressing tool mounted in a fixed relation to the work-head for engagement with the grinding wheel upon said relative axial movement, and the work-head comprising a backing wheel with a supporting member angularly spaced therefrom to leave an open throat adapted to receive the work-piece at one side of the dressing tool and by a movement radially of the backing wheel; substantially as described.

27. In a machine of the character indicated, a work-altering tool, a work-head comprising angularly spaced supporting members for engagement with the periphery of a work-piece, a device for holding the work-piece against the supporting members, said device comprising a pair of spaced rolls, and means for supporting the rolls for independent rotation on a common axis; substantially as described.

28. In a machine of the character indicated, a work-altering tool, a work-head comprising angularly spaced supporting members for engagement with the periphery of a work-piece, a device for holding the work-piece against the supporting members, said device comprising a pair of spaced rolls having their peripheries crowned transversely, and means for supporting the rolls for independent rotation on a common axis with capacity for tilting; substantially as described.

29. In a machine of the character indicated, a pressure device for urging a work-piece into operative position on a work-head and comprising a fork having spaced arms, a shaft between said arms, rolls surrounding said shaft in axial spaced relation, and means for journalling said rolls for independent rotation on the shaft; substantially as described.

30. In a precision internal grinding machine, a grinding wheel, a work-head, means for causing relative axial movement between said wheel and said work-head to provide for getting the wheel and a hollow work-piece into or out of telescoping relation, the work-head comprising a backing wheel with a supporting wheel angularly spaced therefrom to leave an open throat adapted to receive the work-piece by movement transversely of the direction of said relative axial movement, and a wheel dressing tool mounted to overlap one end of the work piece and lying out of the path of transverse introduction of the work-piece to the throat; substantially as described.

31. In a precision internal grinding machine, a grinding wheel, a work-head, means for causing relative axial movement between said wheel and said work-head to provide for getting the wheel and a hollow work-piece into or out of telescoping relation, the work head comprising a backing wheel with a supporting wheel angularly spaced therefrom to leave an open throat adapted to receive the work-piece by movement transversely of the direction of said relative axial movement, a movable pressure member to hold the work-piece in the throat, means responsive to the relative axial movement for moving said pressure member into or out of holding position, and a wheel dressing tool mounted in a fixed position beyond one end of the work-piece and overlapping it; substantially as described.

32. In a precision internal grinding machine, a grinding wheel, a wheel head, a work-head, a sliding table for one of said heads to provide for getting the wheel and a hollow work-piece into or out of telescoping relation, wheels on the work-head for rotatably supporting the work-piece by line contact, one of the wheels being a backing wheel and another a supporting wheel, the wheels being spaced angularly with respect to the work-piece to leave an open throat whereby the work-piece is adapted to be introduced transversely by movement directly towards the work supporting surfaces of the wheels, and a dressing tool for the grinding wheel, the dressing tool being mounted beyond an end of the work head and maintained in an operative position out of the path of transverse introduction of the work-piece to the wheels; substantially as described.

33. In a precision internal grinding machine, a grinding wheel, a work-head, means for causing relative axial movement between the wheel and the work-head to provide for getting the wheel and a hollow work-piece into or out of telescoping relation, the work-head comprising a backing member and a supporting member engaging the periphery of the work-piece, an arm rockably mounted on an axis adjacent to the backing member, a pressure member carried by the arm and movable with respect to the supporting member to provide a space for transverse passage of the work-piece between the supporting member and the pressure member, and means for operating said pressure member in response to the relative axial movement of the work head and the grinding wheel; substantially as described.

PHILIP H. HUTCHINSON.